United States Patent [19]

Cavazza

[11] 4,015,758
[45] Apr. 5, 1977

[54] DISPENSING CLOSURE FOR A CONTAINER

[75] Inventor: Claudio Cavazza, Rome, Italy

[73] Assignee: Sigma-Tau Industrie Farmaceutiche/Riunite S.p.A., Italy

[22] Filed: June 16, 1975

[21] Appl. No.: 586,927

[30] Foreign Application Priority Data

June 17, 1974 Italy .................................. 51562/74

[52] U.S. Cl. ............................................ 222/457.5
[51] Int. Cl.² ......................................... G01F 11/26
[58] Field of Search ......................... 222/457, 457.5

[56] References Cited

UNITED STATES PATENTS

| | | | |
|---|---|---|---|
| 2,035,256 | 3/1936 | Ball | 222/457.5 X |
| 2,091,929 | 8/1937 | Kappenberg | 222/457 |
| 3,137,418 | 6/1964 | Mullen | 222/457 X |
| 3,716,173 | 2/1973 | Yasso | 222/457 X |

Primary Examiner—Stanley H. Tollberg
Assistant Examiner—Norman L. Stack
Attorney, Agent, or Firm—Robert E. Burns; Emmanuel J. Lobato; Bruce L. Adams

[57] ABSTRACT

A dispensing closure for a container for dispensing metered quantities of powder contents and the like therein and having an outer tubular element having a tubular body with an inclined bottom wall that terminates in an upstanding wall spaced from an inner wall surface defining a bottom inlet for communication with the interior of the container. A second element comprising a split cylinder is disposed axially in the outer tubular element and has a top defining an outlet opening on the outer tubular element. The second element has a wall in the tubular body spaced axially from the bottom wall and inwardly from the upstanding wall to define a chamber having an opening communicating with the bottom inlet opening. A second chamber is formed between the first-mentioned chamber with which it communicates and the bottom wall. The wall of the second element defines an outlet communicating with the second chamber and the top outlet opening. If the container is inverted from the upright a quantity of the contents enters the tubular element into the first-mentioned chamber. Upon return to an upright position this quantity of contents is retained in the second chamber and upon reinverting of the container it is dispensed through the top opening and a similar quantity of contents is introduced into the first-mentioned chamber for subsequent metered dispensing.

2 Claims, 9 Drawing Figures

DISPENSING CLOSURE FOR A CONTAINER

BACKGROUND OF THE INVENTION

The present invention is concerned with a suitable device for dispensing a measured quantity of fluids or powders from a container.

SUMMARY OF THE INVENTION

The subject of the invention is a device located inside the neck of a container. Such a device prepares the contents of the container in such a manner that equal doses will be discharged therefrom and prevent the contents from being discharged directly from the container.

The present invention, so that it may be correctly understood and consequently made to function without difficulty, will hereinafter be described with reference to the attached drawings which illustrate one preferred embodiment of the invention by way of example.

DESCRIPTION OF PREFERRED EMBODIMENT

Figure 1:
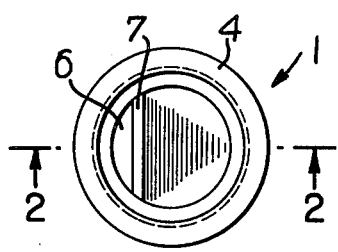
FIG. 1 is a plan view of an outer tubular element of a dispensing closure according to the invention.
Figure 2:
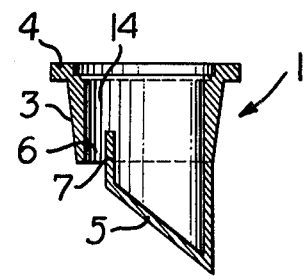
FIG. 2 is a section view taken along section line 2—2 of FIG. 1.
Figure 3:
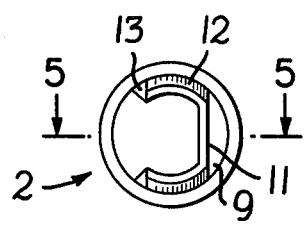
FIG. 3 is a plan view partly in section of inner second element of a dispensing closure for a container according to the invention.
Figure 4:
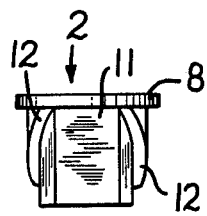
FIG. 4 is a side elevation view of the element in FIG. 3.
Figure 5:
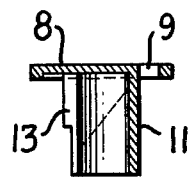
FIG. 5 is a section view taken along section line 5—5 of FIG. 3.
Figure 6:
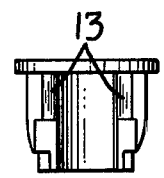
FIG. 6 is another elevation view of the element in FIGS. 3 and 5.
Figure 7:
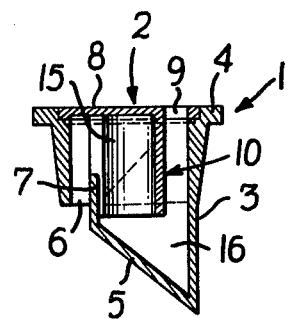
FIG. 7 is an elevation view in section of a dispensing closure according to the invention illustrating the elements in FIG. 3 and in an assembled condition
Figure 8:
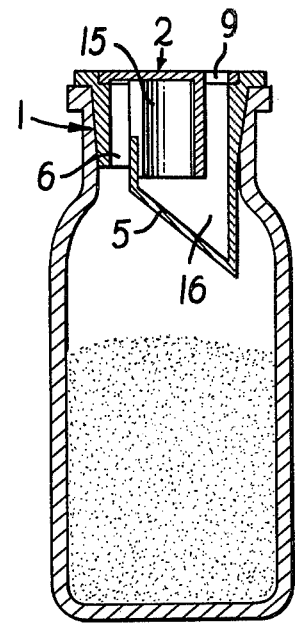
FIG. 8 is an elevation section view of a container with a dispensing closure thereon according to the invention.
Figure 9:
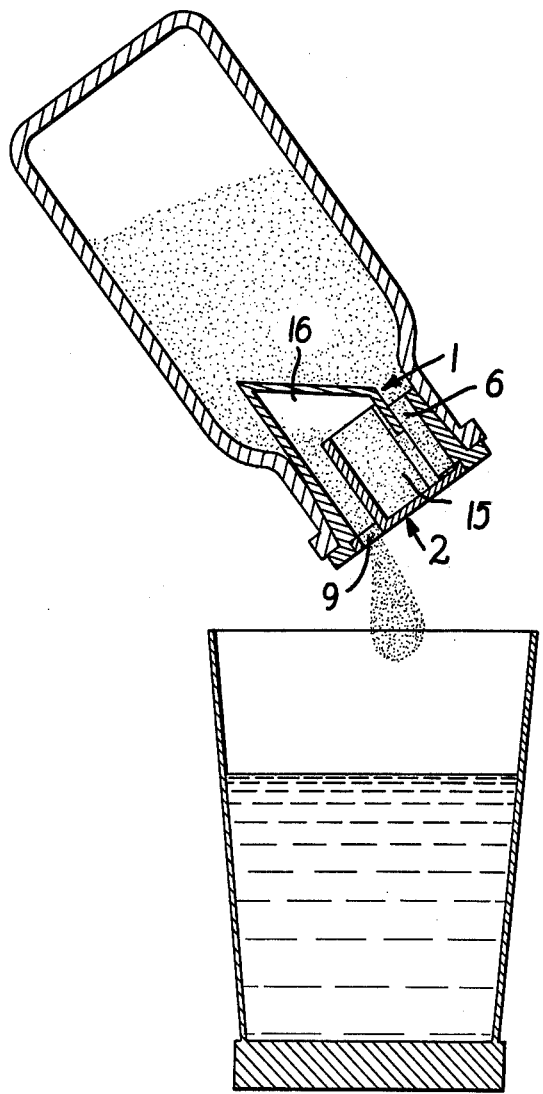
FIG. 9 is a diagrammatic view in section of the container and dispersing closure of FIG. 8 illustrating the operation of the dispensing closure in dispensing metered quantities of a powder.

In each figure, identical or corresponding parts of the device are indicated with the same reference numbers. In reference to the drawings, the device made of plastic or other technologically suitable material is in two parts comprising an outer hollow unit or tubular element. 1 and an inner hollow unit or split cylinder 2.

The outer unit 1 has a circular lateral wall 3, an upper flange 4, a lower or bottom inclined wall 5 and an inlet 6 delimited by a dividing upstanding wall 7 inside said unit 1. The inner unit 2 has an upper top or wall 8, an outlet 9 and a lateral wall 10 characterized by a plane surface 11 and by inclined planes 12 and 13 which are indispensable for allowing the complete introduction and pouring out of fluids or powders. The flange 4 of the outer unit 1 delimits cavity 14 in which the inner unit 2 is to be inserted.

The upper wall 8, the lateral wall 10 of the inner unit 2 and the circular lateral wall 3 of the outer unit 1 form a chamber 15.

The lateral wall 3 and the lower inclined wall 5 of the outer unit 1 form a chamber 16.

When the outer tubular element 1 and the inner element 2 are asssembled into a dispensing closure and mounted on a container the outer element fits snugly into the neck of the container as shown in the drawings. The inner element wall 10 has arcuate wall portions with surfaces snugly engaging corresponding inner surfaces of the outer element and the top thereof is seated snugly on the shoulder of the flange 4 circumferentially of the open end of the outer tubular element. The wall 10 of the inner element is split and the split constitutes an opening confronting the bottom opening 6 and this wall is disposed between the upstanding wall 7 and another inner surface of the outer member opposed to the inner surface opposed to the split wall 10 and spaced therefrom to define an outlet 9 communicating with the interior of the communicating chambers 15, 16. The wall 10 of the inner element 2 terminates spaced from the bottom wall 7 of the outer tubular element 1. The device is quite simple to operate. When the container with the device inserted is held inverted in an upside-down position a quantity of fluid or powder passes through inlet 6 into chamber 15. When the container and device combination is in its upright position, the dose enters chamber 16; with the container and device once again in their upside-down or inverted position, the prepared or metered dose is dispensed through outlet 9 and at the same time a further quantity of substance enters chamber 15. Each time the container and device are turned upside-down the next dose of fluid or powder falls into position while the preceding dose is dispensed. The term "dose" implies an exactly measured quantity; the term "quantity" does not imply that the fluids or powders are exactly measured.

The present invention has been described in the form of one preferred embodiment, but it is understood that variants in execution may be made in practice to the preferred embodiment without going beyond the scope of the invention.

What we claim is:

1. A dispensing closure for a container comprising, a tubular element having a tubular body insertable axially snugly into a neck of a container for being substantially wholly housed therein and having a shoulder about an open top end thereof and a bottom wall partially closing an opposite bottom end, said bottom wall being inclined relative to the axis of said tubular body and terminating in an upstanding wall extending into said tubular body and spaced inwardly from an inner wall surface of the tubular body and extending partially into the interior of said tubular body defining jointly with said inner wall surface a bottom inlet providing in use communication of the interior of said container with the interior of said tubular element, a second element assembled with the first element having a top in use snugly on said shoulder closing partially the open top end of said tubular element and defining a top outlet opening in said tubular element and spaced in a circumferential direction from the bottom inlet into the interior of said tubular element, said second element having a wall extending from said top spaced inwardly from said upstanding wall defining jointly therewith a chamber interiorly of said tubular body having an opening confronting said inner wall surface of said tubular element and in communication with said bottom inlet, said bottom wall being inclined toward said upstanding wall to define a second chamber in communication with the first-mentioned chamber and disposed between the bottom wall and the first chamber and bounded by inner surfaces of said bottom wall and said tubular body, the second element wall extending into the interior of said tubular body between said upstanding wall and another inner wall surface of the tubular body opposite the first-mentioned inner wall surface and disposed spaced axially inwardly from said bottom wall and spaced from said another inner wall surface of the tubular body opposite the first-mentioned inner wall surface thereof and defining therewith an outlet providing communication between the interior of said second chamber and said top outlet opening, whereby when said dispensing closure is mounted on a container for dispensing the content thereof and said container is inverted from an upright position a quantity of said contents enters into the interior of said tubular element through said bottom inlet into the first-mentioned chamber and when said container is returned to an upright position the same quantity of contents is retained in said second chamber of said tubular element and upon reinverting of said container with the closure thereon the quantity of contents in said chamber of said tubular element is dispensed from said second chamber through said top outlet opening and another similar quantity of the contents is introduced into said first-mentioned chamber of said tubular element for subsequent metered dispensing upon reinverting of said container 2. A dispensing closure according to claim 1, in which said wall of said second element has a flat surface opposed to said another inner wall surface of said tubular body and two arcuate wall portions extending therefrom in a direction toward said upstanding wall and defining therebetween said opening confronting said first-mentioned inner wall surface, and said arcuate wall portions engaging snugly corresponding inner wall surfaces of said tubular body.

* * * * *